United States Patent
Wolrich et al.

(10) Patent No.: US 9,898,300 B2
(45) Date of Patent: *Feb. 20, 2018

(54) INSTRUCTION FOR FAST ZUC ALGORITHM PROCESSING

(71) Applicant: Intel Corporation, Santa Clara, CA (US)

(72) Inventors: Gilbert M. Wolrich, Framingham, MA (US); Vinodh Gopal, Westborough, MA (US); Kirk S. Yap, Westborough, MA (US); Wajdi K. Feghali, Boston, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/346,410

(22) Filed: Nov. 8, 2016

(65) Prior Publication Data

US 2017/0052789 A1    Feb. 23, 2017

Related U.S. Application Data

(63) Continuation of application No. 13/730,230, filed on Dec. 28, 2012, now Pat. No. 9,490,971.

(51) Int. Cl.
*G06F 15/76*    (2006.01)
*G06F 7/00*    (2006.01)
(Continued)

(52) U.S. Cl.
CPC .......... *G06F 9/3867* (2013.01); *G06F 9/3005* (2013.01); *G06F 9/30036* (2013.01);
(Continued)

(58) Field of Classification Search
None
See application file for complete search history.

(56) References Cited

U.S. PATENT DOCUMENTS

| | | | |
|---|---|---|---|
| 2003/0043917 A1* | 3/2003 | Bublil | H04N 19/61 375/240.25 |
| 2007/0088772 A1* | 4/2007 | Nunes | G06F 5/017 708/209 |

(Continued)

OTHER PUBLICATIONS

ETSI/SAGE, Specification of the 3GPP Confidentially and Integrity Algorithms 128-EEA3 & 128-EIA3. Document 2: ZUC Specification, Version 1.6, (Jun. 28, 2011), 18 pages.

(Continued)

*Primary Examiner* — Hyun Nam
(74) *Attorney, Agent, or Firm* — Nicholson De Vos Webster & Elliott, LLP

(57) ABSTRACT

Vector instructions for performing ZUC stream cipher operations are received and executed by the execution circuitry of a processor. The execution circuitry receives a first vector instruction to perform an update to a liner feedback shift register (LFSR), and receives a second vector instruction to perform an update to a state of a finite state machine (FSM), where the FSM receives inputs from re-ordered bits of the LFSR. The execution circuitry executes the first vector instruction and the second vector instruction in a single-instruction multiple data (SIMD) pipeline.

21 Claims, 14 Drawing Sheets

(51) Int. Cl.
| | |
|---|---|
| *G06F 9/38* | (2018.01) |
| *G09C 1/00* | (2006.01) |
| *H04L 9/06* | (2006.01) |
| *G06F 9/30* | (2018.01) |
| *G06F 15/80* | (2006.01) |

(52) U.S. Cl.
CPC ...... *G06F 9/30098* (2013.01); *G06F 15/8007* (2013.01); *G09C 1/00* (2013.01); *H04L 9/0662* (2013.01); *H04L 2209/125* (2013.01)

(56) References Cited

U.S. PATENT DOCUMENTS

| | | | | |
|---|---|---|---|---|
| 2014/0079215 | A1* | 3/2014 | Wei | H04L 9/0668 380/46 |
| 2014/0095842 | A1* | 4/2014 | Caprioli | G06F 9/30036 712/222 |
| 2014/0189289 | A1 | 7/2014 | Wolrich et al. | |
| 2014/0189290 | A1* | 7/2014 | Wolrich | H04L 9/0662 712/7 |

OTHER PUBLICATIONS

Final Office Action from U.S. Appl. No. 13/730,230 dated Apr. 21, 2016, 7 pages.
Non-Final Office Action from U.S. Appl. No. 13/730,230 dated Sep. 16, 2015, 9 pages.
Notice of Allowance from U.S. Appl. No. 13/730,230 dated Jul. 6, 2016, 5 pages.
International Preliminary Report and Written Opinion for Application No. PCT/US2013/045695, dated Aug. 28, 2013, 7 pages.
International Search Report for Application No. PCT/US2013/045695, dated Aug. 28, 2013, 3 pages.
Jenkins C., et al., "Instruction Set Extensions for Accelerating Snow 3G on a Multi-Threaded Software-Defined Radio Platform," Proceedings of the SDR'10 Technical Conference and Product Exposition, 2010, pp. 94-100.
Kitsos P., et al., "High Performance ASIC Implementation of the Snow 3G Stream Cipher," IFIP/IEEE VLSI-SOC, 2008, 4 pages.
Non-Final Office Action from U.S. Appl. No. 13/730,216 dated Sep. 10, 2015, 8 pages.
Non-Final Office Action from U.S. Appl. No. 15/238,698 dated Dec. 16, 2016, 13 pages.
Notice of Allowance from U.S. Appl. No. 13/730,216 dated Apr. 11, 2016, 9 pages.
Notice of Allowance from U.S. Appl. No. 13/730,216 dated May 9, 2016, 2 pages.
Office Action from foreign counterpart Korean Patent Application No. 10-2015-7013116, dated Mar. 2, 2016, 12 pages.
Orhanou G., et al., "Snow 3G Stream Cipher Operation and Complexity Study", Contemporary Engineering Sciences, vol. 3, 2010, No. 3, pp. 97-111.

* cited by examiner

ZUC_LFSR ZMM0, ZMM1 (or ZUC_LFSR ZMM0, ZMM1, ZMM1)

| Dword | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| ZMM1 | $S_{15}$ | $S_{14}$ | $S_{13}$ | $S_{12}$ | $S_{11}$ | $S_{10}$ | $S_9$ | $S_8$ | $S_7$ | $S_6$ | $S_5$ | $S_4$ | $S_3$ | $S_2$ | $S_1$ | $S_0$ |
| ZMM0 | $\underline{S_{15}}$ | $\underline{S_{14}}$ | $\underline{S_{13}}$ | $\underline{S_{12}}$ | $\underline{S_{11}}$ | $\underline{S_{10}}$ | $\underline{S_9}$ | $\underline{S_8}$ | $\underline{S_7}$ | $\underline{S_6}$ | $\underline{S_5}$ | $\underline{S_4}$ | $\underline{S_3}$ | $\underline{S_2}$ | $\underline{S_1}$ | $\underline{S_0}$ |

FIG. 3A

ZUC_FSM_Z ZMM0, ZMM1

| Dword | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| ZMM1 | $S_{15}$ | $S_{14}$ | $S_{13}$ | $S_{12}$ | $S_{11}$ | $S_{10}$ | $S_9$ | $S_8$ | $S_7$ | $S_6$ | $S_5$ | $S_4$ | $S_3$ | $S_2$ | $S_1$ | $S_0$ |
| ZMM0 | | | | | | | $R_1$ | | | | | $R_2$ | | | | |
| ZMM0 | | | | | | | $\underline{R_1}$ | | | | | $\underline{R_2}$ | | | | Z |

FIG. 3B

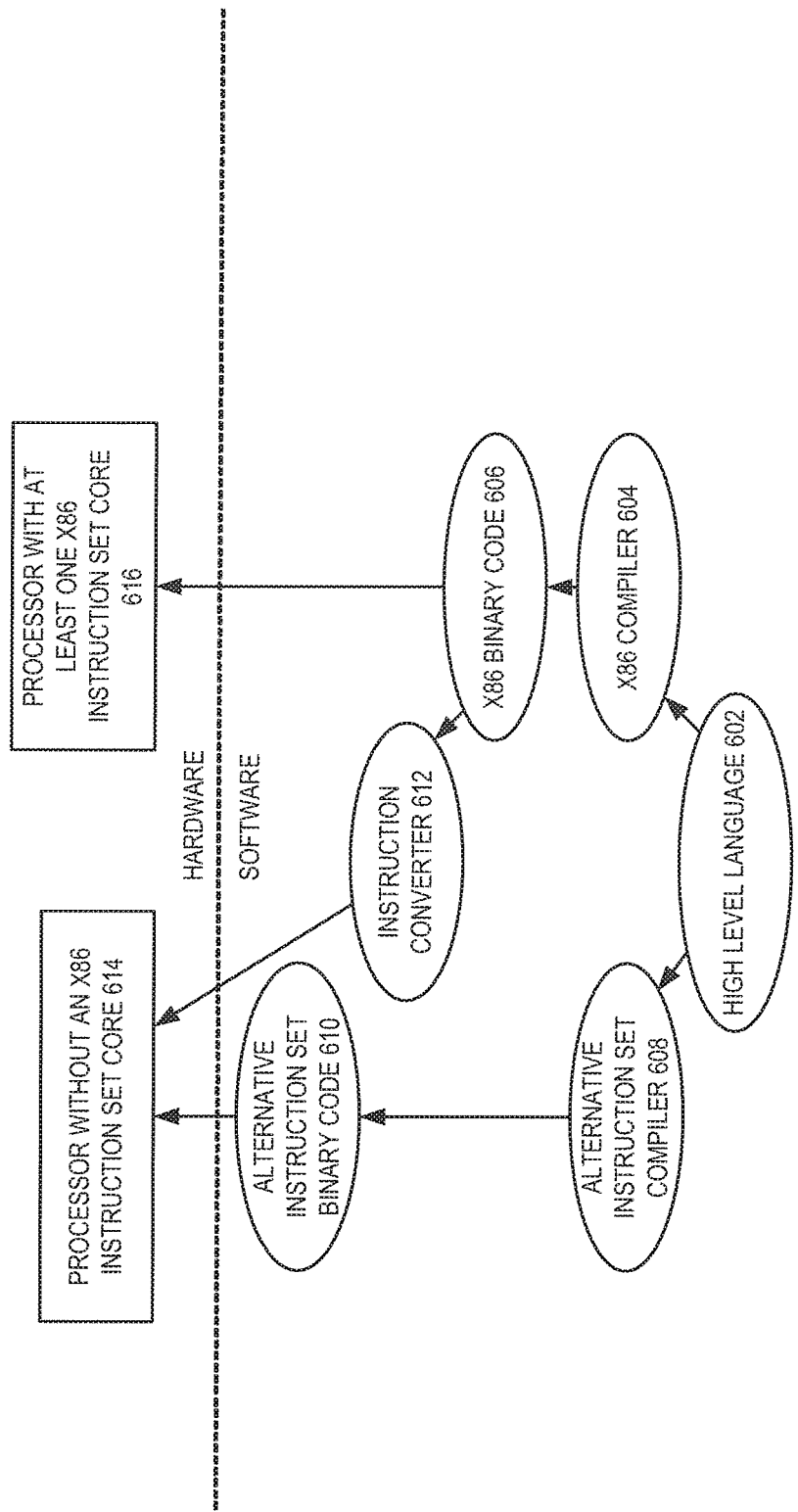

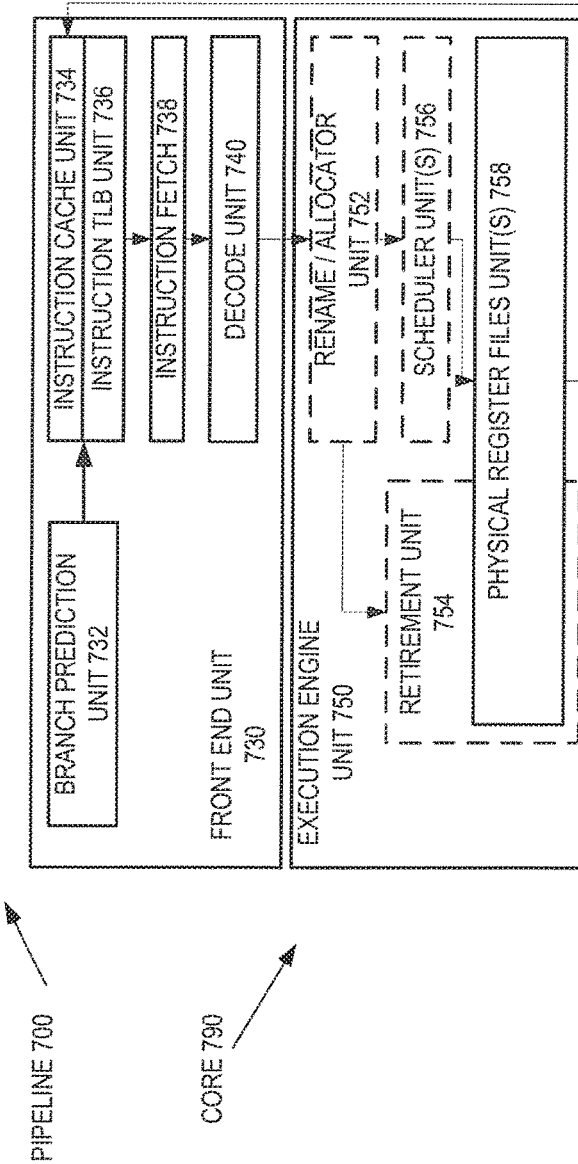
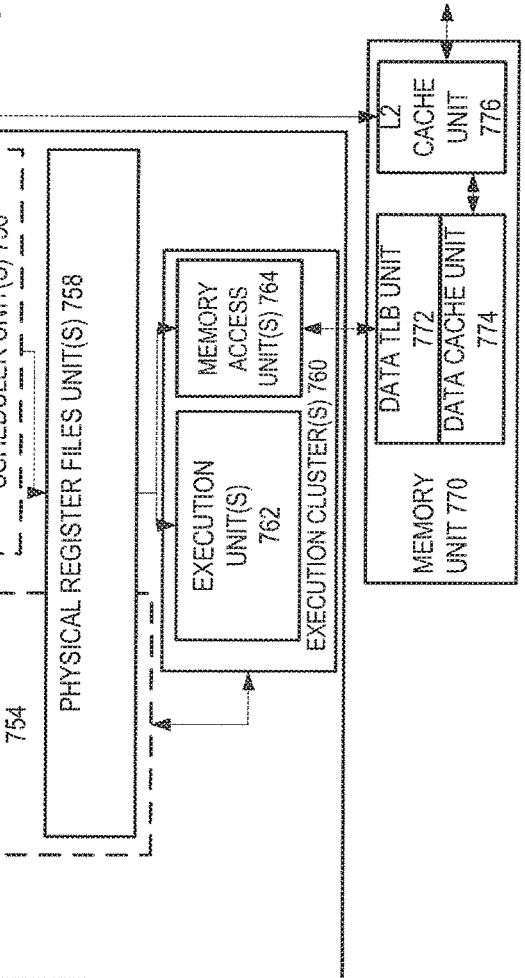

US 9,898,300 B2

INSTRUCTION FOR FAST ZUC ALGORITHM PROCESSING

TECHNICAL FIELD

The present disclosure pertains to microprocessors and associated instruction set architecture that enable efficient wireless security operations.

BACKGROUND ART

The ZUC streaming cipher algorithm has been adopted as the 3rd Generation Partnership Project (3GPP) Confidentiality and Integrity Algorithms 128-EEA3 and 128-EIA3. ZUC was developed by the Data Assurance and Communication Security Research Center of the Chinese Academy of Sciences (DACAS). ZUC has the potential for widespread usage especially for mobile applications.

ZUC is a Linear Feedback Shift Register (LFSR) based stream cipher that is computationally intensive. The LFSR uses five shift operations and six MOD ($2^{31}-1$) additions to develop a new input word. Selected bits of the LFSR are used to determine the next output word and to update a Finite State Machine (FSM) that maintains two 32-bit state words. A Bit-Reordering (BR) function selects eight 16-bit sections of the LFSR for the FSM update and output word formation. The FSM uses eight 8-bit S-BOX translations, as well as two 32-bit word propagate additions and two 32-bit word XOR functions. There are two S-BOX translation functions $S_0$ and $S_1$ that incur memory loads (table lookups) for a software implementation.

The ZUC specification, "*Specification of the 3GPP Confidentiality and Integrity Algorithms 128-EEA3 & 128-EIA3. Document 2: ZUC Specification,*" includes a software reference implementation of ZUC, which uses over 100 lines of C code. Even for optimized assembly code, a large number of cycles are needed to produce a byte of key-stream for ZUC. Moreover, software implementations generally involve a large number memory access. Thus, software implementations of ZUC do not provide sufficient speed and energy efficiency for a wide range of wireless applications.

BRIEF DESCRIPTION OF THE DRAWINGS

Embodiments are illustrated by way of example and not limitation in the Figures of the accompanying drawings:

FIGS. 3A and 3B illustrate vector instructions for performing ZUC operations according to another embodiment.

FIG. 6 is a block diagram illustrating the use of a software instruction converter to convert binary instructions in a source instruction set to binary instructions in a target instruction set according to one embodiment.

FIG. 7A is a block diagram of an in-order and out-of-order pipeline according to one embodiment.

FIG. 7B is a block diagram of an in-order and out-of-order core according to one embodiment.

DESCRIPTION OF THE EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description.

Embodiments described herein provide new processor instructions to perform the ZUC stream cipher operations at markedly improved performance when compared to existing software solutions. In one embodiment, the new processor instructions include a ZUC_FSM instruction for updating a Finite State Machine (FSM), ZUC_LFSR_HI and ZUC_LFSR_LO instructions for updating a Linear Feedback Shift Register (LFSR), ZUC_BR for bit reordering (BR), and variations of these instructions. Each of the instructions utilizes vector registers to perform efficient vectorized computations.

In the following description, the term "word" is used to refer to a 31-bit data element or a 32-bit data element (which is also known as a "double-word"). Whenever the term "word" is used for the first time regarding a particular data element, the specific size of that data element will be described. Further, the operator ∥ represents the concatenate operator, and the operator<<<represents left cyclic shift, which is also referred to as rotate. The operator ⊕ represents the XOR operator, and ⊞ represents integer addition modulo $2^{32}$ (also referred to as propagate addition).

Figure 1:
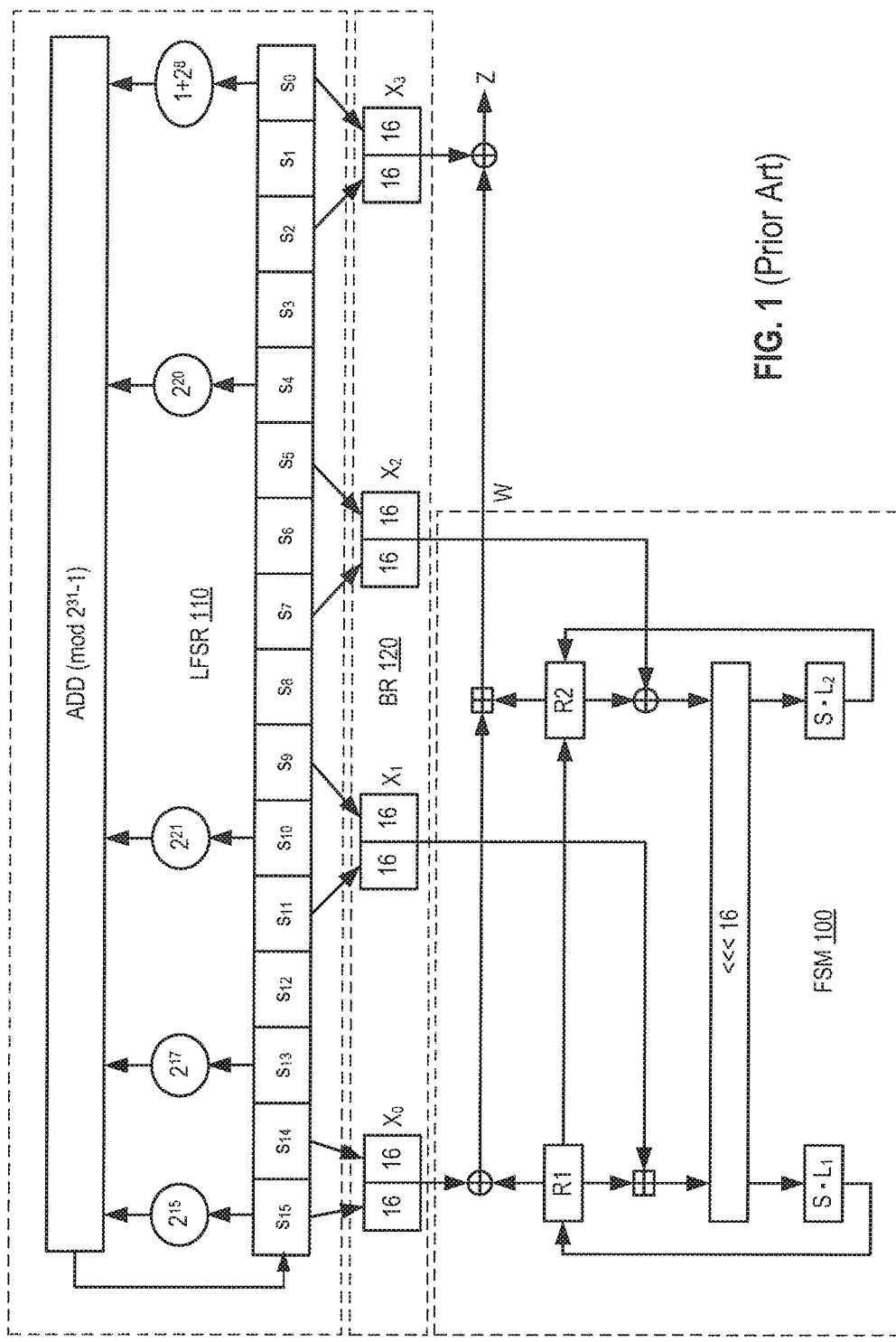
FIG. 1 is a diagram illustrating ZUC stream cipher operations.

Before describing the new instructions, it is helpful to explain the basic concepts of the ZUC algorithm. The ZUC algorithm can be partitioned into three logic functions, including LFSR, BR, and FSM. FIG. 1 illustrates an example of an LFSR 110, a BR 120 and an FSM 100 according to the ZUC algorithm. The LFSR 110 contains sixteen 31-bit words designated as $s_{15}$ to $s_0$. The LFSR 110 is updated by calculating a new word for $s_{15}$ and shifting previous words $s_{15}$ to $s_1$ into the $s_{14}$ to so positions. The updated $s_{15}$ is calculated as:

$s_{15}$ (updated)=$2^{15}s_{15}+2^{17}s_{13}+2^{21}s_{10}+2^{20}s_4+(1+2^8)$ $s_0$ mod $(2^{31}-1)$.

The BR 120 function produces four 32-bit words $X_0$, $X_1$, $X_2$ and $X_3$ from selected bits of the LFSR 110. Three of the words $X_0$, $X_1$ and $X_2$ provide input to the FSM 100. Word $X_3$ is XORed with the 32-bit FSM output W to produce the final output Z. Specifically, the four words $X_0$, $X_1$, $X_2$ and $X_3$ are formed as follows:

$X_0 = s_{15}[30:15] \| s_{14}[15:0]$, $X_1 = s_{11}[15:0] \| s_9[30:15]$, $X_2 = s_7[15:0] \| s_5[30:15]$, $X_3 = s_2[15:0] \| s_0[30:15]$.

The FSM 100 includes two state registers R1 and R2. The initial state registers R1 and R2 are used in separate logic paths along with the $X_0$-$X_3$ inputs to calculate Z and update R1 and R2. The critical path is updating R1 and R2, which includes a propagate addition, XOR, rotate, linear function and S-BOX calculation. The linear functions (L1 and L2) are defined as:

$L1(X) = X \oplus (X<<<_{32}2) \oplus (X<<<_{32}10) \oplus (X<<<_{32}18) \oplus (X<<<_{32}24)$, $L2(X) = X \oplus (X<<<_{32}8) \oplus (X<<<_{32}14) \oplus (X<<<_{32}22) \oplus (X<<<_{32}30)$, where $X<<<_{32}k$ indicates a k-bit cyclic shift of the 32-bit register X to the left.

The S-Box functions are applied to the output of the linear functions. The two 32-bit S-Box functions are each composed of four 8×8 S-BOX functions, where two S-BOX functions ($S_0$ and $S_1$) are used alternately on each 8-bit sections.

The above description explains the computations of the ZUC algorithm. Embodiments of the invention provide new instructions to an instruction set architecture (ISA) to enable efficient computation of the ZUC algorithm. The ISA described herein supports Single Instruction, Multiple Data (SIMD) operations. Instead of a scalar instruction operating on only one data element or a pair of data elements, a SIMD instruction (also referred to as packed data instruction or vector instruction) may operate on multiple data elements or multiple pairs of data elements simultaneously or in parallel. The processor may have parallel execution hardware responsive to the vector instruction to perform the multiple operations simultaneously or in parallel.

The new instructions and corresponding data path enable a processor supporting 256-bit or 512-bit architectural vector registers to execute ZUC operations. In the following description, the term YMM refers to a 256-bit vector register and ZMM refers to a 512-bit vector register. Although YMM and ZMM registers are used in the following description, it is appreciated that other vector registers (e.g., 128-bit XMM registers) may be used in alternative embodiments.

In one embodiment, the LFSR state of sixteen 32-bit data elements, $s_{15}$ to $s_0$, is stored in two vector registers. For 256-bit YMM registers, $s_{15}$ to $s_8$ can be stored in a first YMM register (e.g., YMM1) and $s_7$ to $s_0$ can be stored in a second YMM register (e.g., YMM2) as shown in the table below:

| Word | 0 | 1 | 2 | 3 | 4 | 5 | 6 | 7 |
|---|---|---|---|---|---|---|---|---|
| YMM1 | $s_{15}$ | $s_{14}$ | $s_{13}$ | $s_{12}$ | $s_{11}$ | $s_{10}$ | $s_9$ | $s_8$ |
| YMM2 | $s_7$ | $s_6$ | $s_5$ | $s_4$ | $s_3$ | $s_2$ | $s_1$ | $s_0$ |

The words may be stored with each 31-bit word occupying a 32-bit lane of the YMM register. For YMM1 register that stores $s_{15}$ to $s_8$, its 256 bit positions [255:0] are occupied by $s_{15}$=[254:224], $s_{14}$=[222:192], $s_{13}$=[190:160], $s_{12}$=[158:128], $s_{11}$=[126:96], $s_{10}$=[94:64], $s_9$=[62:32], and $s_8$=[30:0]. For YMM2 register that stores $s_{57}$ to $s_0$, its 256 bit positions [255:0] are occupied by $s_7$=[254:224], $s_6$=[222:192], $s_5$=[190:160], $s_4$=[158:128], $s_3$=[126:96], $s_2$=[94:64], $s_1$=[62:32], and $s_0$=[30:0].

Figure 2A:
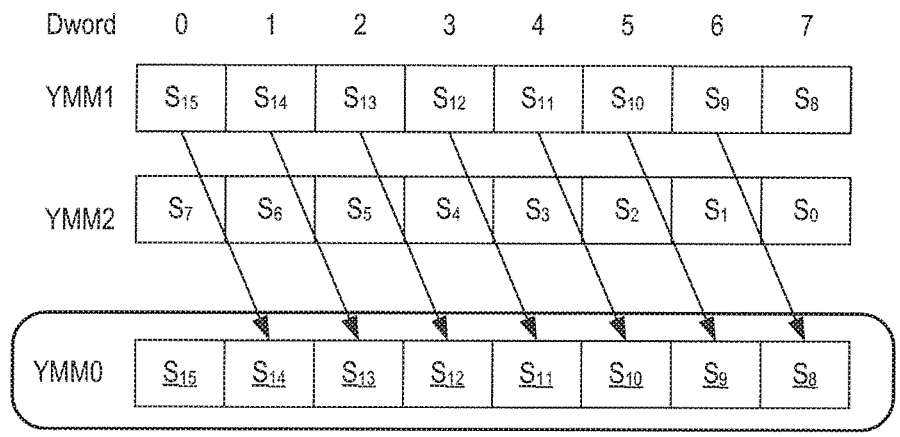
FIGS. 2A-2E illustrate vector instructions for performing ZUC operations according to one embodiment.

In one embodiment, two vector instructions are provided for updating the LFSR 110. FIG. 2A illustrates a vector instruction ZUC_LFSR_HI YMM0, YMM1, YMM2 for performing a first portion of the LFSR update according to one embodiment. The first source register YMM1 contains LFSR words $s_{15}$ to $s_8$, and the second source register YMM2 contains LFSR words $s_7$ to $s_0$. YMM0 is the destination register containing the updated $s_{15}$, which is computed from the pre-updated $s_{15}$, $s_{13}$, $s_{10}$, $s_4$, and $s_0$. YMM0 also contains the pre-updated words $s_{15}$ to $s_{59}$ from YMM1 shifted into the $s_{14}$ to $s_8$ positions. The updated data elements in YMM0 are shown with underlines. Specifically, YMM0 is divided into eight 32-bit lanes, with each lane containing:

lane 7 [254:224]=$s_{15}$ (updated)=$2^{15}s_{15}+2^{17}s_{13}+2^{21}s_{10}+2^{20}s_4+(1+2^8) s_0$ mod $(2^{31}-1)$, lane 6 [222:192]=$s_{14}$ from source $s_{15}$ /* right shift by 32 bits from YMM1/ lane 5 [190:160]=$s_{13}$ from source $s_{14}$, /* right shift by 32 bits from YMM1*/ lane 4 [158:128]=$s_{12}$ from source $s_{13}$, /* right shift by 32 bits from YMM1*/ lane 3 [126:96]=$s_{11}$ from source $s_{12}$, /* right shift by 32 bits from YMM1*/ lane 2 [94:64]=$s_{10}$ from source $s_{11}$, /* right shift by 32 bits from YMM1*/ lane 1 [62:32]=$s_9$ from source $s_{10}$, /* right shift by 32 bits from YMM1*/ lane 0 [30:0]=$s_8$ from source $s_9$. /* right shift by 32 bits from YMM1*/

Figure 2B:
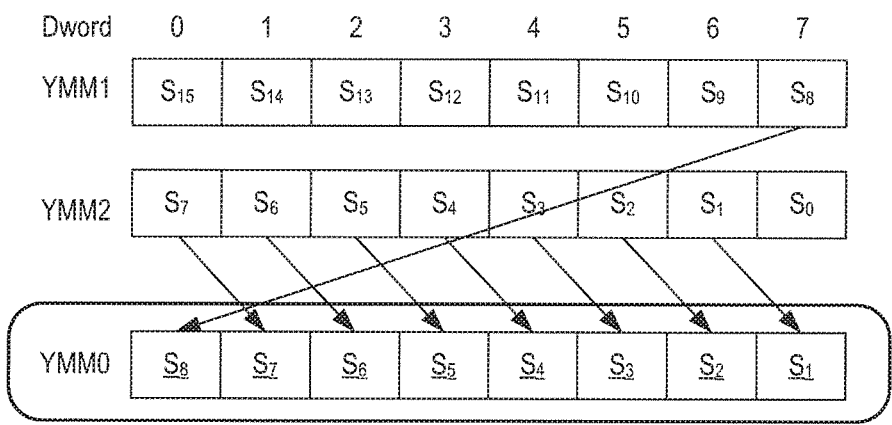

FIG. 2B illustrates a vector instruction ZUC_LFSR_LO YMM0, YMM1, YMM2 for performing a second portion of the LFSR update according to one embodiment. The source registers YMM1 and YMM2 contain the same LFSR state as in the ZUC_LFSR_HI instruction; that is, YMM1 and YMM2 contain the LFSR data elements prior to the update by the ZUC_LFSR_HI instruction. The YMM0 destination register for the ZUC_LFSR_LO instruction is written with the right-shifted data elements of YMM2 ($s_7$ to $s_0$) by 32 bits, with most significant lane being copied from the least significant lane (bits 31:0) of source register YMM1, i.e., $s_8$ before update. The updated data elements in YMM0 are shown with underlines. Specifically, YMM0 is divided into eight 32-bit lanes, with each lane containing:

lane 7 [254:224]=$s_7$ from source $s_8$, /* bits 31:0 of YMM1*/ lane 6 [222:192]=$s_6$ from source $s_7$, /* right shift by 32 bits from YMM2*/ lane 5 [190:160]=$s_5$ from source $s_6$, /* right shift by 32 bits from YMM2*/ lane 4 [158:128]=$s_4$ from source $s_5$, /* right shift by 32 bits from YMM2*/ lane 3 [126:96]=$s_3$ from source $s_4$, /* right shift by 32 bits from YMM2*/ lane 2 [94:64]=$s_2$ from source $s_3$, /* right shift by 32 bits from YMM2*/ lane 1 [62:32]=$s_1$ from source $s_2$, /* right shift by 32 bits from YMM2*/ lane 0 [30:0]=$s_0$ from source $s_1$. /* right shift by 32 bits from YMM2*/

In one embodiment, each of the instructions ZUC_LFSR_HI and ZUC_LFSR_LO can be executed on a SIMD port in a 3-cycle pipeline.

Figure 2C:
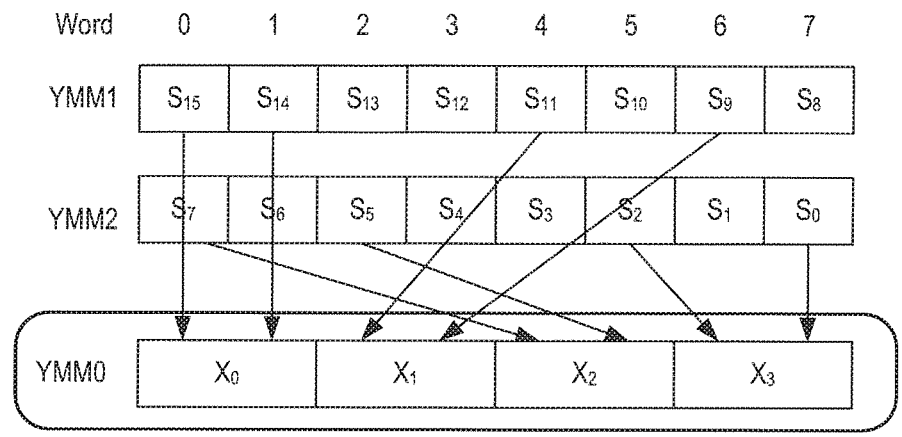

In the following, instructions for BR and FSM processing are described. FIG. 2C illustrates a vector instruction ZUC_BR YMM0, YMM1, YMM2 for performing the BR operations. The first operand YMM1 contains the LFSR HI state $s_{15}$ to $s_8$, the second operand YMM2 contains LFSR LO state $s_7$ to $s_0$. YMM0 is the destination operand with YMM0 [127:96]=$X_0$, YMM0[95:64]=$X_1$, YMM0[63:32]=$X_2$, YMM0[31:0]=$X_3$, where $X_0$, $X_1$, $X_2$ and $X_3$ are formed by concatenating selected LFSR data elements as described above with reference to FIG. 1. In one embodiment, the extraction and concatenation of the selected LFSR bits can be performed by routing (i.e., wiring) of predetermined bits the LFSR state to directly form the four output words.

Figure 2D:
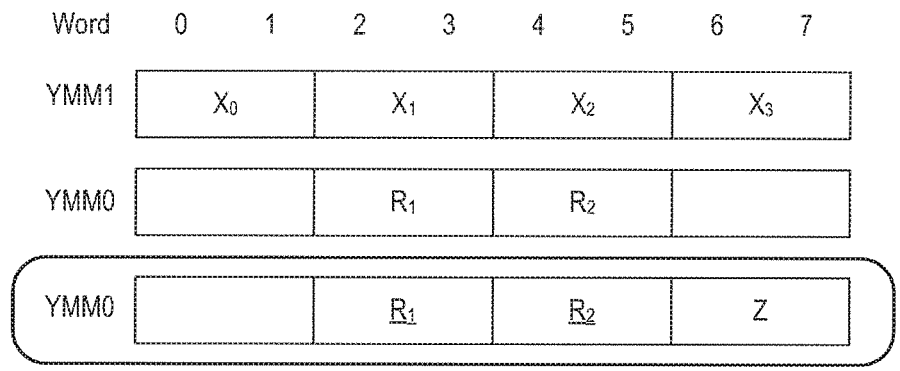

FIG. 2D illustrates a vector instruction ZUC_FSM YMM0, YMM1 for updating the FSM and produce a 32-bit Z output word according to one embodiment. ZUC_FSM is a SIMD instruction that updates two FSM state registers (R1 and R2) and generates the Z output in parallel. The source/destination operand YMM0 sources the start of state R1 and R2, and is updated with the result R1 and R2 (shown with underlines) as well as the 32-bit output word Z. The other source operand YMM1 sources $X_0$ to $X_3$. The computations of the updated R1 and R2 and output Z include propagate addition, XOR, rotate, linear function and S-BOX calculation, as described above with reference to FIG. 1. In one embodiment, the S-Box calculation can be performed by table lookups. As the rotations performed by L1 and L2 are constant, the rotations of each linear function can be accomplished via routing (i.e., wiring) of predetermined bits of each of the five XOR inputs to form an output. That is, the output of each linear function can be formed by directly routing the inputs of the linear function.

In one embodiment, the contents of each operand of ZUC_FSM is as follows: YMM0[95:64]=R1, YMM0[63:32]=R2 and YMM0[31:00]=32-bit Z output. Moreover, YMM1[127:96]=$X_0$, YMM1[95:64]=$X_1$, YMM1[63:32]=X2 and YMM1[31:00]=X The ZUC_FSM instruction can be executed in a SIMD pipeline; that is, a pipeline filled with SIMD operations. In one embodiment, the ZUC_FSM instruction can be executed in a 3-cycle SIMD pipeline. The 32-bit Z output word can be moved from bits [31:0] of the ZUC_FSM destination register via a VMOVD r32/m32, xmm1 instruction.

Figure 2E:
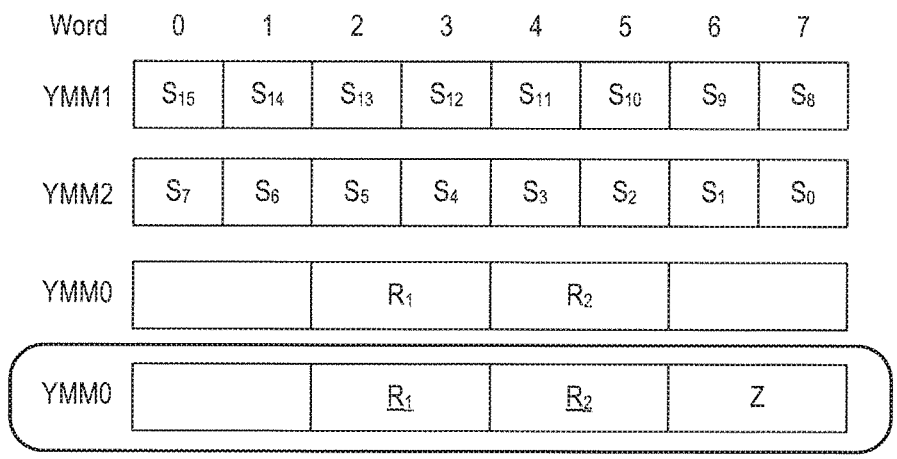

FIG. 2E illustrates an alternative vector instruction ZUC_FSM_A YMM0, YMM1, YMM2 for updating the FSM and produce a 32-bit Z output word according to one embodiment. ZUC_FSM_A is a SIMD instruction that updates two FSM state registers (R1 and R2) and generates the Z output in parallel. This instruction has three source operands: YMM0, YMM1 and YMM2, and one destination operand YMM0. The source/destination operand YMM0 sources the start of state R1 and R2, and is updated with the result R1 and R2 (shown with underlines) as well as the 32-bit output word Z. The other two source operands YMM1 and YMM2 together source the entire LFSR state $s_{15}$ to $s_0$. In one embodiment, the operations of ZUC_FSM_A include the logic for extracting the necessary 16-bit sections from the LFSR state and concatenating the extracted bit sections. Therefore, when the ZUC_FSM_A is used with the ZUC_LFSR_HI and ZUC_LFSR_LO instructions, it is not necessary to use a ZUC_BR instruction.

Alternatively, a single vector instruction that uses ZMM registers can be executed to perform the LFSR update. The single vector instruction is defined as ZUC_LFSR_Z ZMM0, ZMM1, as shown in FIG. 3A according to one embodiment. The instruction sources the present LSFR state from ZMM1 and writes the updated state to ZMM0. The sixteen LFSR state $s_{15}$ to $s_0$ can be stored in a single 512-bit ZMM register divided into sixteen lanes, with $s_{15}$ in lane 15 (bits [510:480]), $s_{14}$ in lane 14 (bits [478:448]), down to $s_0$ in lane 0 (bits [30:0]). In FIG. 3A, the updated data elements in ZMM0 are shown with underlines. Specifically, each lane of ZMM0 contains:

lane 15 [510:480]=$s_{15}$ (updated)=$2^{15}s_{15}+2^{17}s_{13}+2^{21}s_{10}+2^2s_4+(1+2^8)s_0$ mod $(2^{31}-1)$, lane 14 [478:448]=$s_{14}$ from source $s_{15}$, /* right shift by 32 bits from ZMM1*/ lane 13 [446:416]=$s_{13}$ from source $s_{14}$, /* right shift by 32 bits from ZMM1*/ lane 12 [414:384]=$s_{12}$ from source $s_{13}$, /* right shift by 32 bits from ZMM1*/ lane 11 [382:352]=$s_{11}$ from source $s_{12}$, /* right shift by 32 bits from ZMM1*/ lane 10 [350:320]=$s_{10}$ from source $s_{11}$, /* right shift by 32 bits from ZMM1*/ lane 9 [318:288]=$s_9$ from source $s_{10}$, /* right shift by 32 bits from ZMM1*/ lane 8 [286:256]=$s_8$ from source $s_9$, /* right shift by 32 bits from ZMM1*/ lane 7 [254:224]=$s_7$ from source $s_8$, /* right shift by 32 bits from ZMM1*/ lane 6 [222:192]=$s_6$ from source $s_7$, /* right shift by 32 bits from ZMM1*/ lane 5 [190:160]=$s_5$ from source $s_6$, /* right shift by 32 bits from ZMM1*/ lane 4 [158:128]=$s_4$ from source $s_5$, /* right shift by 32 bits from ZMM1*/ lane 3 [126:96]=$s_3$ from source $s_4$, /* right shift by 32 bits from ZMM1*/ lane 2 [94:64]=$s_2$ from source $s_3$, /* right shift by 32 bits from ZMM1*/ lane 1 [62:32]=$s_1$ from source $s_2$, /* right shift by 32 bits from ZMM1*/ lane 0 [30:0]=$s_0$ from source $s_1$. /* right shift by 32 bits from ZMM1*/

In an alternative embodiment for compatibility with the YMM version of the instruction, ZUC_LFSR_Z may be defined as ZUC_LFSR_Z ZMM0, ZMM1, ZMM1; that is, the source operand ZMM1 is repeated to enable processing of $s_{15}$ to $s_8$ from the first source and $s_7$ to $s_0$ from the second source. ZUC_LFSR_Z can be executed in a 3-cycle SIMD pipeline.

FIG. 3B illustrates a vector instruction ZUC_FSM_Z ZMM0, ZMM1 that uses ZMM registers for updating the FSM and generating the output Z according to one embodiment. ZUC_FSM_Z is a SIMD instruction that updates two FSM state registers (R1 and R2) and generates the Z output in parallel. The source/destination operand ZMM0 sources the start of state R1 and R2, and is updated with the result R1 and R2 (shown with underlines) as well as the 32-bit output word Z. The source operand ZMM1 sources the LFSR state $s_{15}$ to $s_0$. In one embodiment, the operations of ZUC_FSM_Z include the logic for extracting the necessary 16-bit sections from the LFSR state and concatenating the extracted bit sections. Therefore, when the ZUC_FSM_Z instruction is used with the ZUC_LFSR instruction, it is not necessary to use a ZUC_BR instruction.

The instructions described thus far are based on either all 16 words in a single ZMM register, or words 15 to 8 in consecutive word locations of one YMM register and words 7 to 0 in consecutive word locations of a second YMM register. An alternate organization of the words in the YMM registers can eliminate the need for the ZUC_BR instruction. This alternative word organization maintains the words needed by the FSM and Z output in one of the YMM registers. The table below shows that YMM1 contains the eight words needed to form $X_0$ to $X_3$.

| Word | 0 | 1 | 2 | 3 | 4 | 5 | 6 | 7 |
|---|---|---|---|---|---|---|---|---|
| YMM1 | $s_{15}$ | $s_{14}$ | $s_{11}$ | $s_9$ | $s_7$ | $s_6$ | $s_2$ | $s_0$ |
| YMM2 | $s_{13}$ | $s_{12}$ | $s_{10}$ | $s_8$ | $s_5$ | $s_4$ | $s_3$ | $s_1$ |

Figure 4A:
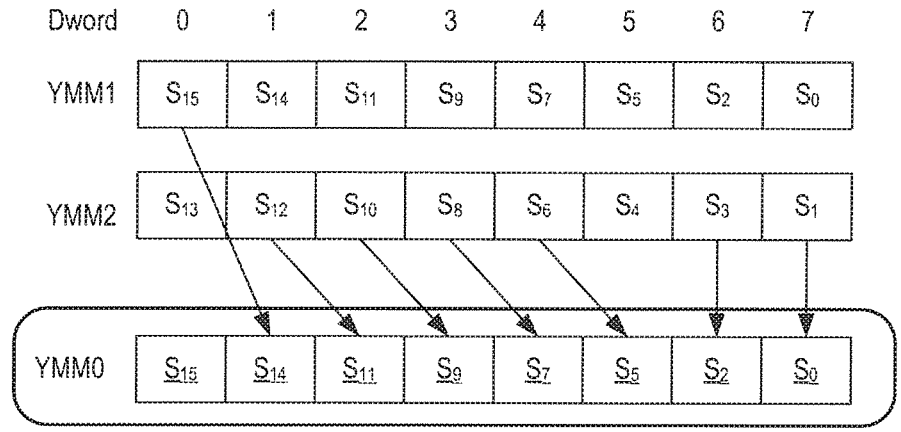
FIGS. 4A-4C illustrate vector instructions for performing ZUC operations according to yet another embodiment.
Figure 4B:
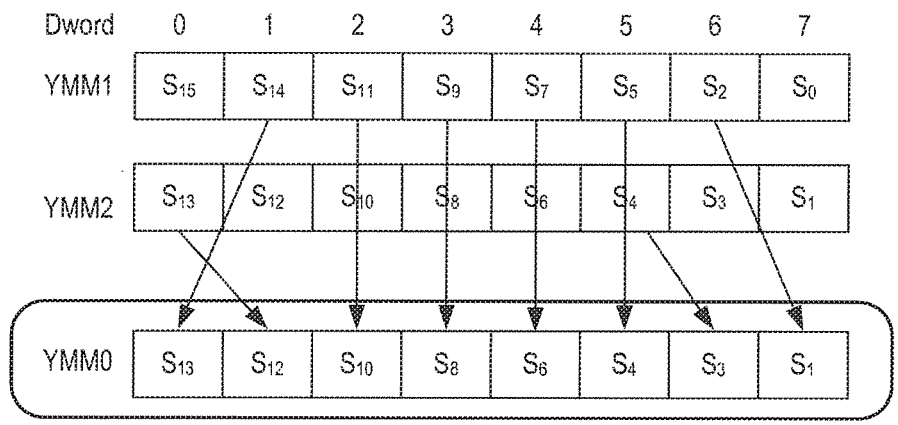
Figure 4C:
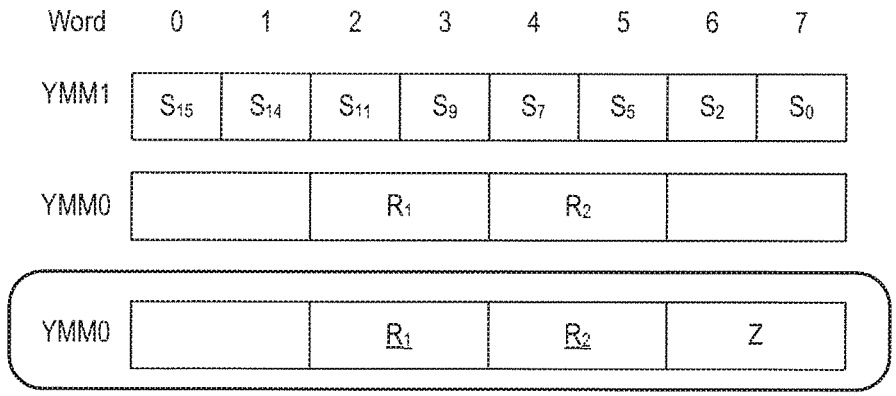

FIG. 4A and FIG. 4B illustrate vector instructions ZUC_LFSR_HI_1 and ZUC_LFSR_LO_1, respectively, according to an alternative embodiment. In this alternative embodiment, the LFSR update computation is the same as described in FIG. 1. However, as the LFSR state needed for determining $X_0$ to $X_3$ is in YMM1, a vector instruction ZUC_FSM_1 YMM0, YMM1 can be defined (as shown in the embodiment of FIG. 4C) that performs bit-reordering operations in addition to FSM update and Z output generation. The source/destination operand YMM0 sources the start of state R1 and R2, and is updated with the result R1 and R2 (shown with underlines) as well as the 32-bit output word Z. The source operand YMM1 sources the LFSR state needed for determining $X_0$ to $X_3$. In one embodiment, the operations of ZUC_FSM_1 include the logic for extracting the necessary 16-bit sections from the LFSR state and concatenating the extracted bit sections. Therefore, when the ZUC_FSM_1 instruction is used with the ZUC_LFSR_HI_1 and ZUC_LFSR_LO_1 instructions, it is not necessary to use a ZUC_BR instruction.

In an embodiment where the ZUC_BR instruction is used, the ZUC_BR instruction can determine the $X_0$ to $X_3$ words for the next LSFR state before updating the LFSR. This embodiment removes the latency of first updating the LFSR and then forming the needed $X_0$ to $X_3$ FSM inputs. In this embodiment, the ZUC_BR instruction uses the same data path as the ZUC_LFSR_HI instruction to determine the new value of $s_{15}$, and then outputs the updated values for $X_0$ to $X_3$. The instructions can be executed in consecutive cycles in a 3-cycle pipeline, first ZUC_BR and then ZUC_LFSR_HI and ZUC_LFSR_LO for a 4-cycle latency for the next FSM output latency.

In an alternative embodiment, the ZUC_BR instruction can extract words $X_0$ to $X_3$ from the LFSR state once the instructions ZUC_LFSR_HI and ZUC_LFSR_LO have updated the LFSR state. In this alternative embodiment, the ZUC_BR instructions can be performed by straightforward routing of inputs to outputs, but the latency for determining $X_0$ to $X_3$ for the new FSM output is the latency of the LFSR update plus the ZUC_BR instruction. This additional latency, however, can be hidden by using a 3-stage software pipeline.

The following pseudo-code segment illustrates one example instruction sequence for ZUC stream cipher computations. Alternative sequences of the instructions may also be used to hide the latency of the instructions in a SIMD pipeline. Using two pairs of YMM registers ((YMM0, YMM1) and (YMM2, YMM3)) for alternate LFSR updates enables the BR and FSM processing to run at the same time as the LFSR update. In the following example, it is assumed that the initial state YMM0=$s_{15}$ to $s_8$, YMM1=$s_7$ to $s_0$, and YMM4=R1, R2. The processing can continue until all of the required Z outputs are generated.

```
Begin:
/*first phase: use YMM0 and YMM1 for BR and FSM processing of first 32-bit output*/
    ZUC_BR YMM5, YMM0, YMM1 /* X0 to X3 into YMM5*/
    ZUC_FSM YMM4, YMM5 /*update R1, R2 first Z */
    VMOVD r32+, XMM4 /* move first Z to key stream */
    /*update LFSR to YMM2 and YMM3 */
    ZUC_LFSR_HI YMM2, YMM0, YMM1
    ZUC_LFSR_LO YMM3, YMM0, YMM1
/* second phase: use YMM2 and YMM3 for BR and FSM processing of second 32-bit output */
    ZUC_BR YMM6, YMM2, YMM3 /* X0 to X3 into YMM6*/
    ZUC_FSM YMM4, YMM6 /*update R1, R2 second Z */
    VMOVD r32+, XMM4 /* move first Z to key stream */
    /* now update LFSR back to YMM0 and YMM1 */
    ZUC_LFSR_HI YMM0, YMM2, YMM3
    ZUC_LFSR_LO YMM1, YMM2, YMM3
/* repeat the first phase and the second phase */
```

The following pseudo-code segment illustrates another example instruction sequence for ZUC stream cipher computations. Alternative sequences of the instructions may also be used to hide the latency of the instructions in a SIMD pipeline. In this example, BR processing is not needed as the FSM logic performs the bit-reordering function. Two pairs of YMM registers ((YMM0, YMM1) and (YMM2, YMM3)) are used for alternate LFSR updates to enable the FSM processing to run at the same time as the LFSR update. In this example, it is assumed that the initial state YMM0=$s_{15}$, $s_{14}$, $s_{11}$, $s_9$, $s_7$, $s_6$, $s_2$, $s_0$, YMM1=$s_{13}$, $s_{12}$, $s_{10}$, $s_8$, $s_5$, $s_4$, $s_3$, $s_1$, and YMM4=R1, R2. The processing can continue until all of the required Z outputs are generated.

```
Begin:
/*first phase: use YMM0 for FSM processing of first 32-bit output*/
    ZUC_FSM_1 YMM4, YMM0 /*update R1, R2 first Z */
    VMOVD r32+, XMM4 /* move first Z to key stream */
    /*update LFSR to YMM2 and YMM3 */
    ZUC_LFSR_HI_1 YMM2, YMM0, YMM1
    ZUC_LFSR_LO_1 YMM3, YMM0, YMM1
/* second phase: use YMM2 for FSM processing of second 32-bit output */
    ZUC_FSM_1 YMM4, YMM2 /*update R1, R2 second Z */
    VMOVD r32+, XMM4 /* move first Z to key stream */
    /* now update LFSR back to YMM0 and YMM1 */
    ZUC_LFSR_HI_1 YMM0, YMM2, YMM3
    ZUC_LFSR_LO_1 YMM1, YMM2, YMM3
/* repeat the first phase and the second phase */
```

In one embodiment, to further improve execution performance, a multi-buffer implementation of three simultaneous streams can be supported with pipelining. That is, three ZUC stream ciphers can be executed in three simultaneous streams.

Figure 5:
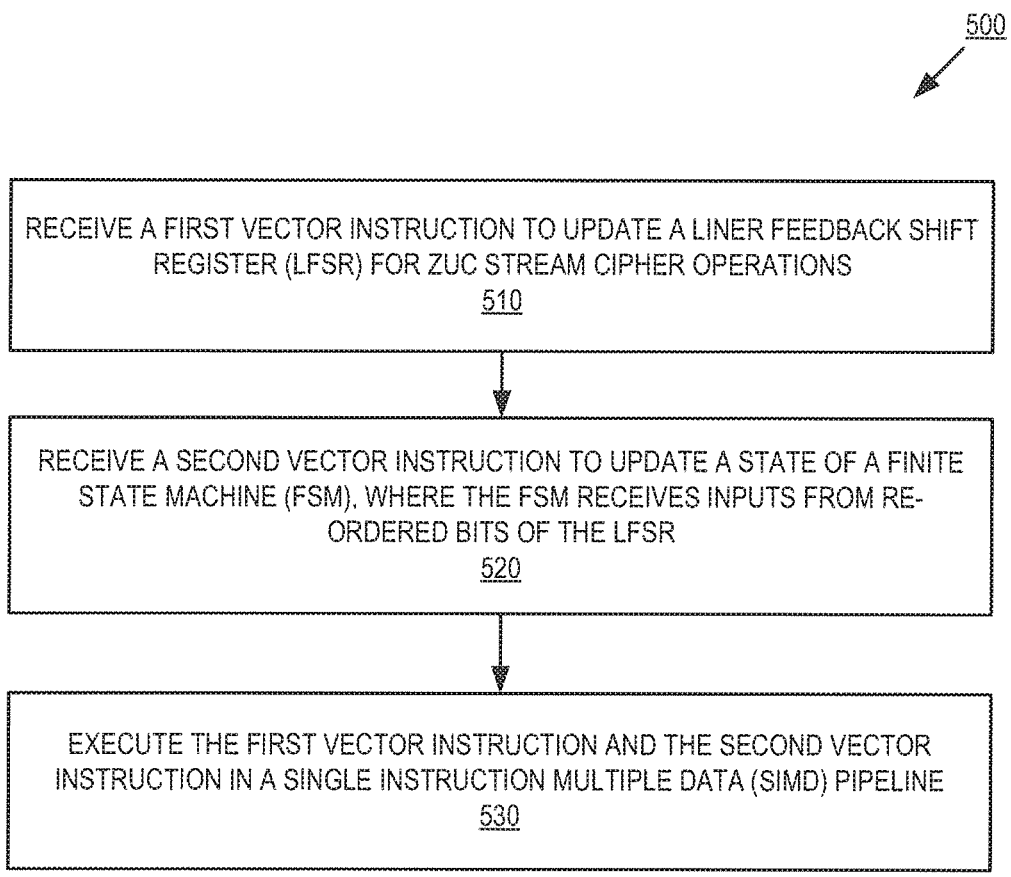
FIG. 5 is a flow diagram illustrating a method of using vector instructions for performing ZUC operations according to one embodiment.

FIG. 5 is a flow diagram of a method 500 for performing ZUC stream cipher operations according to one embodiment. The method 500 begins with a processor (more specifically, execution circuitry such as the execution engine unit 750 of FIG. 7B) receives a vector instruction to update an LFSR for the ZUC stream cipher operations (block 510). The execution circuitry also receives a second instruction to update a state of an FSM, where the FSM receives inputs from re-ordered bits of the LFSR (block 520). The execution circuitry then executes the first vector instruction and the second vector instruction in a SIMD pipeline (block 530). In one embodiment, the first vector instruction is ZUC_LFSR_HI, ZUC_LFSR_LO, ZUC_LFSR, or ZUC_LFSR_1; the second vector instruction is ZUC_FSM, ZUC_FSM_A, ZUC_FSM_Z, or ZUC_FSM_1, as described above with reference to FIGS. 2A-2E, 3A-3B and 4A-4C.

In various embodiments, the method of FIG. 5 may be performed by a general-purpose processor, a special-purpose processor (e.g., a graphics processor or a digital signal processor), or another type of digital logic device or instruction processing apparatus. In some embodiments, the method of FIG. 5 may be performed by a processor, apparatus, or system, such as the embodiments shown in FIGS. 7A-B, 8A-B and 9-13. Moreover, the processor, apparatus, or system shown in FIGS. 7A-B, 8A-B and 9-13 may perform embodiments of operations and methods either the same as, similar to, or different than those of the method of FIG. 5.

In some embodiments, the processor, apparatus, or system of FIGS. 7A-B, 8A-B and 9-13 may operate in conjunction with an instruction converter that converts an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 6 is a block diagram contrasting the use of a software instruction converter according to embodiments of the invention. In the illustrated embodiment, the instruction converter is a software instruction converter, although alternatively the instruction converter may be implemented in software, firmware, hardware, or various combinations thereof. FIG. 6 shows a program in a high level language 602 may be compiled using an x86 compiler 604 to generate x86 binary code 606 that may be natively executed by a processor with at least one x86 instruction set core 616. The processor with at least one x86 instruction set core 616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 604 represents a compiler that is operable to generate x86 binary code 606 (e.g., object code) that can, with or without additional linkage processing, be executed on the processor with at least one x86 instruction set core 616. Similarly, FIG. 6 shows the program in the high level language 602 may be compiled using an alternative instruction set compiler 608 to generate alternative instruction set binary code 610 that may be natively executed by a processor without at least one x86 instruction set core 614 (e.g., a processor with cores that execute the MIPS instruction set of MIPS Technologies of Sunnyvale, Calif. and/or that execute the ARM instruction set of ARM Holdings of Sunnyvale, Calif.). The instruction converter 612 is used to convert the x86 binary code 606 into code that may be natively executed by the processor without an x86 instruction set core 614. This converted code is not likely to be the same as the alternative instruction set binary code 610 because an instruction converter capable of this is difficult to make; however, the converted code will accomplish the general operation and be made up of instructions from the alternative instruction set. Thus, the instruction converter 612 represents software, firmware, hardware, or a combination thereof that, through emulation, simulation or any other process, allows a processor or other electronic device that does not have an x86 instruction set processor or core to execute the x86 binary code 606.

Exemplary Core Architectures
In-order and Out-of-order Core Block Diagram

FIG. 7A is a block diagram illustrating both an exemplary in-order pipeline and an exemplary register renaming, out-of-order issue/execution pipeline according to embodiments of the invention. FIG. 7B is a block diagram illustrating both an exemplary embodiment of an in-order architecture core and an exemplary register renaming, out-of-order issue/execution architecture core to be included in a processor according to embodiments of the invention. The solid lined boxes in FIGS. 7A and 7B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 7A, a processor pipeline 700 includes a fetch stage 702, a length decode stage 704, a decode stage 706, an allocation stage 708, a renaming stage 710, a scheduling (also known as a dispatch or issue) stage 712, a register read/memory read stage 714, an execute stage 716, a write back/memory write stage 718, an exception handling stage 722, and a commit stage 724.

FIG. 7B shows processor core 790 including a front end unit 730 coupled to an execution engine unit 750, and both are coupled to a memory unit 770. The core 790 may be a reduced instruction set computing (RISC) core, a complex instruction set computing (CISC) core, a very long instruction word (VLIW) core, or a hybrid or alternative core type. As yet another option, the core 790 may be a special-purpose core, such as, for example, a network or communication core, compression engine, coprocessor core, general purpose computing graphics processing unit (GPGPU) core, graphics core, or the like.

The front end unit 730 includes a branch prediction unit 732 coupled to an instruction cache unit 734, which is coupled to an instruction translation lookaside buffer (TLB) 736, which is coupled to an instruction fetch unit 738, which is coupled to a decode unit 740. The decode unit 740 (or decoder) may decode instructions, and generate as an output one or more micro-operations, micro-code entry points, microinstructions, other instructions, or other control signals, which are decoded from, or which otherwise reflect, or are derived from, the original instructions. The decode unit 740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 790 includes a microcode ROM or other medium that stores microcode for certain macroinstructions (e.g., in decode unit 740 or otherwise within the front end unit 730). The decode unit 740 is coupled to a rename/allocator unit 752 in the execution engine unit 750.

The execution engine unit 750 includes the rename/allocator unit 752 coupled to a retirement unit 754 and a set of one or more scheduler unit(s) 756. The scheduler unit(s) 756 represents any number of different schedulers, including reservations stations, central instruction window, etc. The scheduler unit(s) 756 is coupled to the physical register file(s) unit(s) 758. Each of the physical register file(s) units 758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 758 comprises a vector registers unit, a write mask registers unit, and a scalar registers unit. These register units may provide architectural vector registers, vector mask registers, and general purpose registers. The physical register file(s) unit(s) 758 is overlapped by the retirement unit 754 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 754 and the physical register file(s) unit(s) 758 are coupled to the execution cluster(s) 760. The execution cluster(s) 760 includes a set of one or more execution units 762 and a set of one or more memory access units 764. The execution units 762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 756, physical register file(s) unit(s) 758, and execution cluster(s) 760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 764). It should also be understood that where separate pipelines are used, one or more of these pipelines may be out-of-order issue/execution and the rest in-order.

The set of memory access units 764 is coupled to the memory unit 770, which includes a data TLB unit 772 coupled to a data cache unit 774 coupled to a level 2 (L2) cache unit 776. In one exemplary embodiment, the memory access units 764 may include a load unit, a store address unit, and a store data unit, each of which is coupled to the data TLB unit 772 in the memory unit 770. The instruction cache unit 734 is further coupled to a level 2 (L2) cache unit 776 in the memory unit 770. The L2 cache unit 776 is coupled to one or more other levels of cache and eventually to a main memory.

By way of example, the exemplary register renaming, out-of-order issue/execution core architecture may implement the pipeline 700 as follows: 1) the instruction fetch 738 performs the fetch and length decoding stages 702 and 704; 2) the decode unit 740 performs the decode stage 706; 3) the rename/allocator unit 752 performs the allocation stage 708 and renaming stage 710; 4) the scheduler unit(s) 756 performs the schedule stage 712; 5) the physical register file(s) unit(s) 758 and the memory unit 770 perform the register read/memory read stage 714; the execution cluster 760 perform the execute stage 716; 6) the memory unit 770 and the physical register file(s) unit(s) 758 perform the write back/memory write stage 718; 7) various units may be involved in the exception handling stage 722; and 8) the retirement unit 754 and the physical register file(s) unit(s) 758 perform the commit stage 724.

The core 790 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 790 includes logic to support a packed data instruction set extension (e.g., SSE, AVX1, AVX2, etc.), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 734/774 and a shared L2 cache unit 776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 8B:
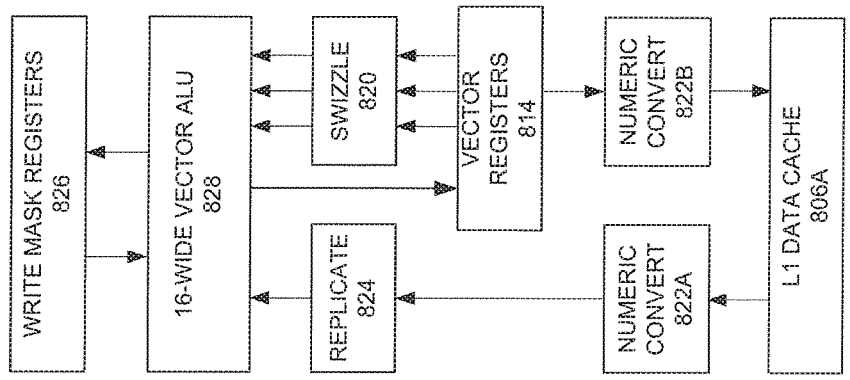
FIGS. 8A-B are block diagrams of a more specific exemplary in-order core architecture according to one embodiment.
Figure 8A:
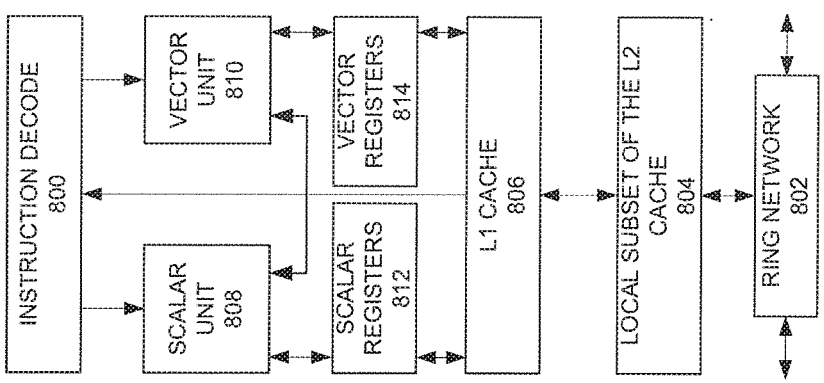

FIGS. 8A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 8A is a block diagram of a single processor core, along with its connection to the on-die interconnect network 802 and with its local subset of the Level 2 (L2) cache 804, according to embodiments of the invention. In one embodiment, an instruction decoder 800 supports the x86 instruction set with a packed data instruction set extension. An L1 cache 806 allows low-latency accesses to cache memory into the scalar and vector units. While in one embodiment (to simplify the design), a scalar unit 808 and a vector unit 810 use separate register sets (respectively, scalar registers 812 and vector registers 814) and data transferred between them is written to memory and then read back in from a level 1 (L1) cache 806, alternative embodiments of the invention may use a different approach (e.g., use a single register set or include a communication path that allow data to be transferred between the two register files without being written and read back).

The local subset of the L2 cache 804 is part of a global L2 cache that is divided into separate local subsets, one per processor core. Each processor core has a direct access path to its own local subset of the L2 cache 804. Data read by a processor core is stored in its L2 cache subset 804 and can be accessed quickly, in parallel with other processor cores accessing their own local L2 cache subsets. Data written by a processor core is stored in its own L2 cache subset 804 and is flushed from other subsets, if necessary. The ring network ensures coherency for shared data. The ring network is bi-directional to allow agents such as processor cores, L2 caches and other logic blocks to communicate with each other within the chip.

FIG. 8B is an expanded view of part of the processor core in FIG. 8A according to embodiments of the invention. FIG. 8B includes an L1 data cache 806A part of the L1 cache 804, as well as more detail regarding the vector unit 810 and the vector registers 814. Specifically, the vector unit 810 is a 16-wide vector processing unit (VPU) (see the 16-wide ALU 828), which executes one or more of integer, single-precision float, and double-precision float instructions. The VPU supports swizzling the register inputs with swizzle unit 820, numeric conversion with numeric convert units 822A-B, and replication with replication unit 824 on the memory input. Write mask registers 826 allow predicating resulting vector writes.

Processor with Integrated Memory Controller and Graphics

Figure 9:
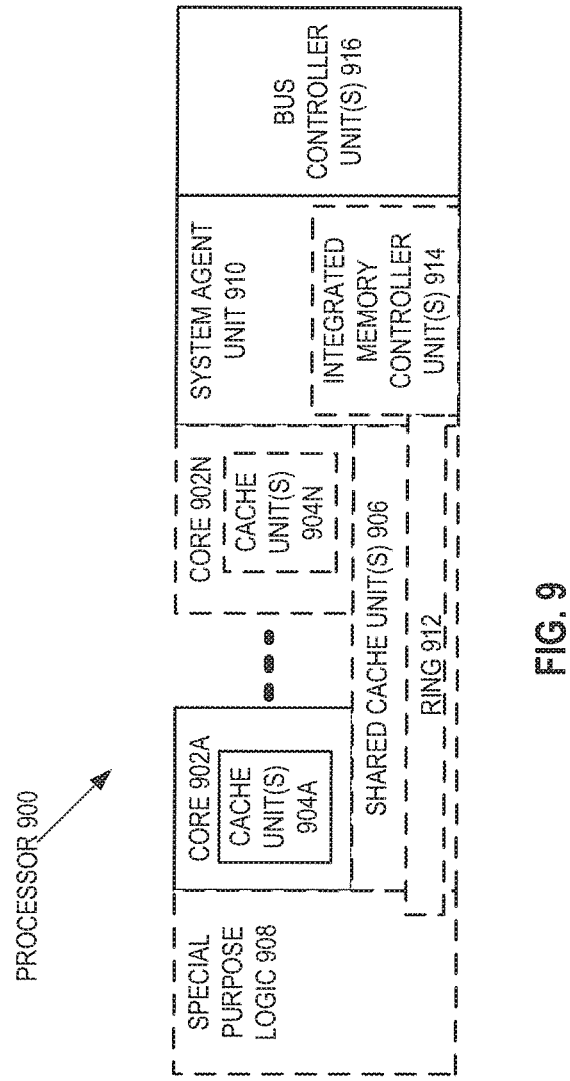
FIG. 9 is a block diagram of a processor according to one embodiment.

FIG. 9 is a block diagram of a processor 900 that may have more than one core, may have an integrated memory controller, and may have integrated graphics according to embodiments of the invention. The solid lined boxes in FIG. 9 illustrate a processor 900 with a single core 902A, a system agent 910, a set of one or more bus controller units 916, while the optional addition of the dashed lined boxes illustrates an alternative processor 900 with multiple cores 902A-N, a set of one or more integrated memory controller unit(s) 914 in the system agent unit 910, and special purpose logic 908.

Thus, different implementations of the processor 900 may include: 1) a CPU with the special purpose logic 908 being integrated graphics and/or scientific (throughput) logic (which may include one or more cores), and the cores 902A-N being one or more general purpose cores (e.g., general purpose in-order cores, general purpose out-of-order cores, a combination of the two); 2) a coprocessor with the cores 902A-N being a large number of special purpose cores intended primarily for graphics and/or scientific (throughput); and 3) a coprocessor with the cores 902A-N being a large number of general purpose in-order cores. Thus, the processor 900 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 900 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 906, and external memory (not shown) coupled to the set of integrated memory controller units 914. The set of shared cache units 906 may include one or more mid-level caches, such as level 2 (L2), level 3 (L3), level 4 (L4), or other levels of cache, a last level cache (LLC), and/or combinations thereof. While in one embodiment a ring based interconnect unit 912 interconnects the integrated graphics logic 908, the set of shared cache units 906, and the system agent unit 910/integrated memory controller unit(s) 914, alternative embodiments may use any number of well-known techniques for interconnecting such units. In one embodiment, coherency is maintained between one or more cache units 906 and cores 902-A-N.

In some embodiments, one or more of the cores 902A-N are capable of multi-threading. The system agent 910 includes those components coordinating and operating cores 902A-N. The system agent unit 910 may include for example a power control unit (PCU) and a display unit. The PCU may be or include logic and components needed for regulating the power state of the cores 902A-N and the integrated graphics logic 908. The display unit is for driving one or more externally connected displays.

The cores 902A-N may be homogenous or heterogeneous in terms of architecture instruction set; that is, two or more of the cores 902A-N may be capable of execution the same instruction set, while others may be capable of executing only a subset of that instruction set or a different instruction set.

Exemplary Computer Architectures

FIGS. 10-13 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 10:
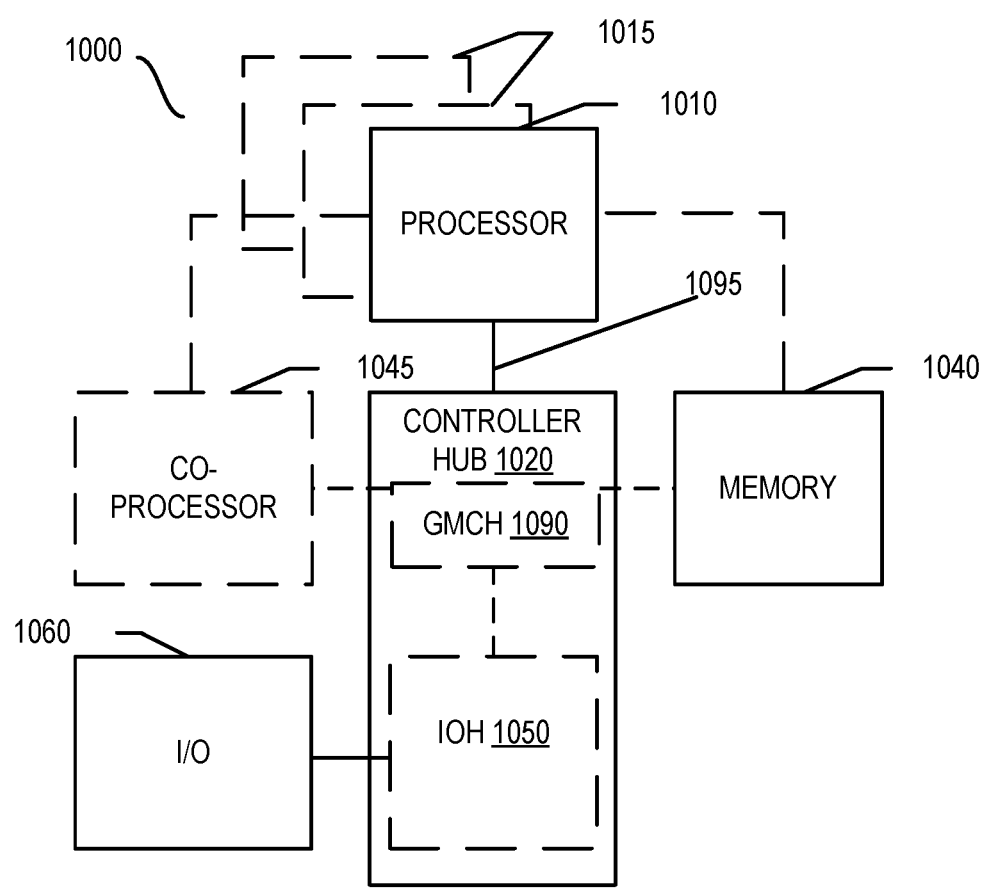
FIG. 10 is a block diagram of a system in accordance with one embodiment.

Referring now to FIG. 10, shown is a block diagram of a system 1000 in accordance with one embodiment of the present invention. The system 1000 may include one or more processors 1010, 1015, which are coupled to a controller hub 1020. In one embodiment the controller hub 1020 includes a graphics memory controller hub (GMCH) 1090 and an Input/Output Hub (IOH) 1050 (which may be on separate chips); the GMCH 1090 includes memory and graphics controllers to which are coupled memory 1040 and a coprocessor 1045; the IOH 1050 is couples input/output (I/O) devices 1060 to the GMCH 1090. Alternatively, one or both of the memory and graphics controllers are integrated within the processor (as described herein), the memory 1040 and the coprocessor 1045 are coupled directly to the processor 1010, and the controller hub 1020 in a single chip with the IOH 1050.

The optional nature of additional processors 1015 is denoted in FIG. 10 with broken lines. Each processor 1010, 1015 may include one or more of the processor cores described herein and may be some version of the processor 900.

The memory 1040 may be, for example, dynamic random access memory (DRAM), phase change memory (PCM), or a combination of the two. For at least one embodiment, the controller hub 1020 communicates with the processor(s) 1010, 1015 via a multi-drop bus, such as a frontside bus (FSB), point-to-point interface such as QuickPath Interconnect (QPI), or similar connection 1095.

In one embodiment, the coprocessor 1045 is a special-purpose processor, such as, for example, a high-throughput MIC processor, a network or communication processor, compression engine, graphics processor, GPGPU, embedded processor, or the like. In one embodiment, controller hub 1020 may include an integrated graphics accelerator.

There can be a variety of differences between the physical resources 1010, 1015 in terms of a spectrum of metrics of merit including architectural, micro-architectural, thermal, power consumption characteristics, and the like.

In one embodiment, the processor 1010 executes instructions that control data processing operations of a general type. Embedded within the instructions may be coprocessor instructions. The processor 1010 recognizes these coprocessor instructions as being of a type that should be executed by the attached coprocessor 1045. Accordingly, the processor 1010 issues these coprocessor instructions (or control signals representing coprocessor instructions) on a coprocessor bus or other interconnect, to coprocessor 1045. Coprocessor(s) 1045 accept and execute the received coprocessor instructions.

Figure 11:
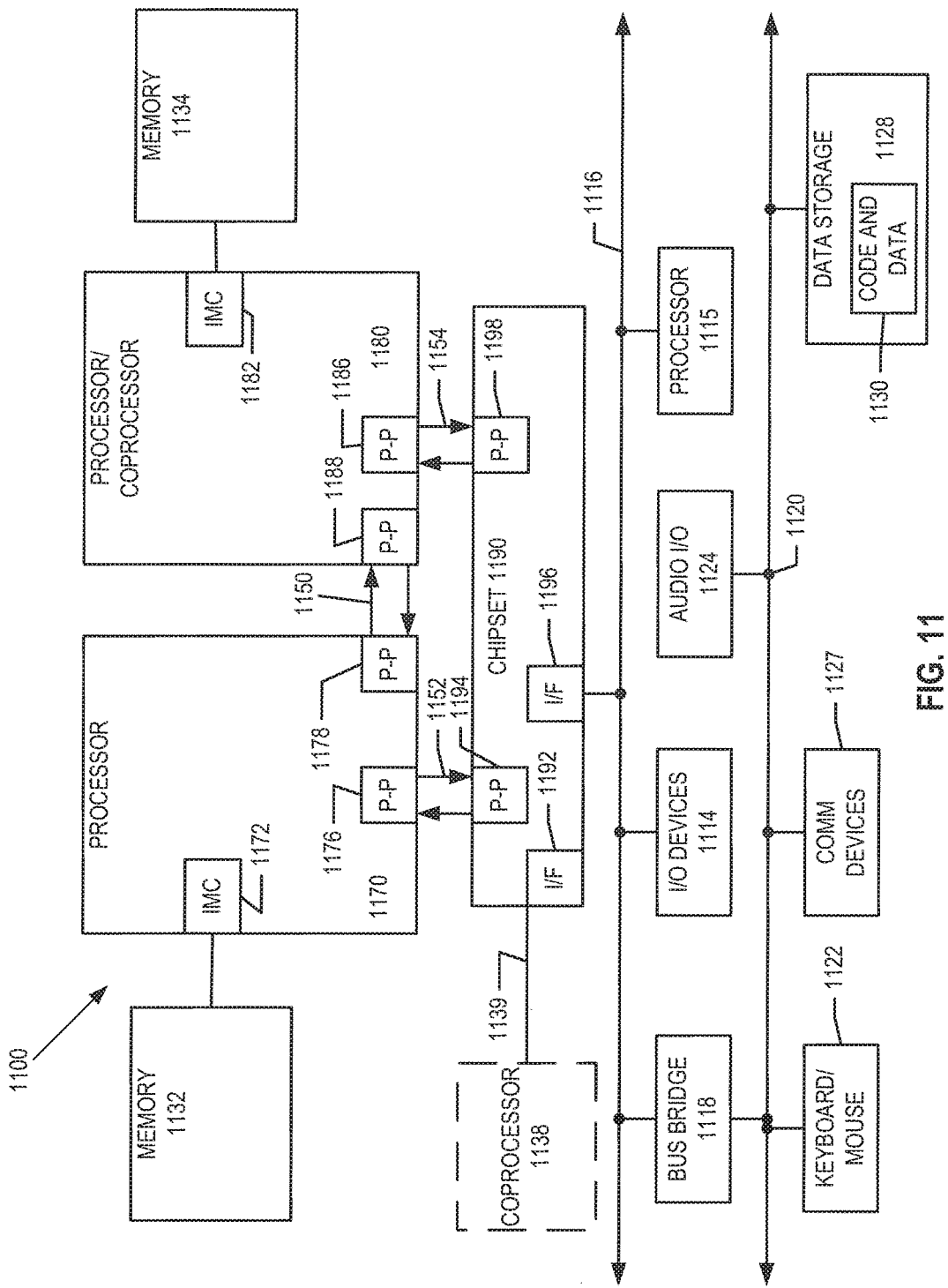
FIG. 11 is a block diagram of a second system in accordance with one embodiment.

Referring now to FIG. 11, shown is a block diagram of a first more specific exemplary system 1100 in accordance with an embodiment of the present invention. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of the processor 900. In one embodiment of the invention, processors 1170 and 1180 are respectively processors 1010 and 1015, while coprocessor 1138 is coprocessor 1045. In another embodiment, processors 1170 and 1180 are respectively processor 1010 coprocessor 1045.

Processors 1170 and 1180 are shown including integrated memory controller (IMC) units 1172 and 1182, respectively. Processor 1170 also includes as part of its bus controller units point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 may each exchange information with a chipset 1190 via individual P-P interfaces 1152, 1154 using point to point interface circuits 1176, 1194, 1186, 1198. Chipset 1190 may optionally exchange information with the coprocessor 1138 via a high-performance interface 1139. In one embodiment, the coprocessor 1138 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present invention is not so limited.

As shown in FIG. 11, various I/O devices 1114 may be coupled to first bus 1116, along with a bus bridge 1118 which couples first bus 1116 to a second bus 1120. In one embodiment, one or more additional processor(s) 1115, such as coprocessors, high-throughput MIC processors, GPGPU's, accelerators (such as, e.g., graphics accelerators or digital signal processing (DSP) units), field programmable gate arrays, or any other processor, are coupled to first bus 1116. In one embodiment, second bus 1120 may be a low pin count (LPC) bus. Various devices may be coupled to a second bus 1120 including, for example, a keyboard and/or mouse 1122, communication devices 1127 and a storage unit 1128 such as a disk drive or other mass storage device which may include instructions/code and data 1130, in one embodiment. Further, an audio I/O 1124 may be coupled to the second bus 1120. Note that other architectures are possible. For example, instead of the point-to-point architecture of FIG. 11, a system may implement a multi-drop bus or other such architecture.

Figure 12:
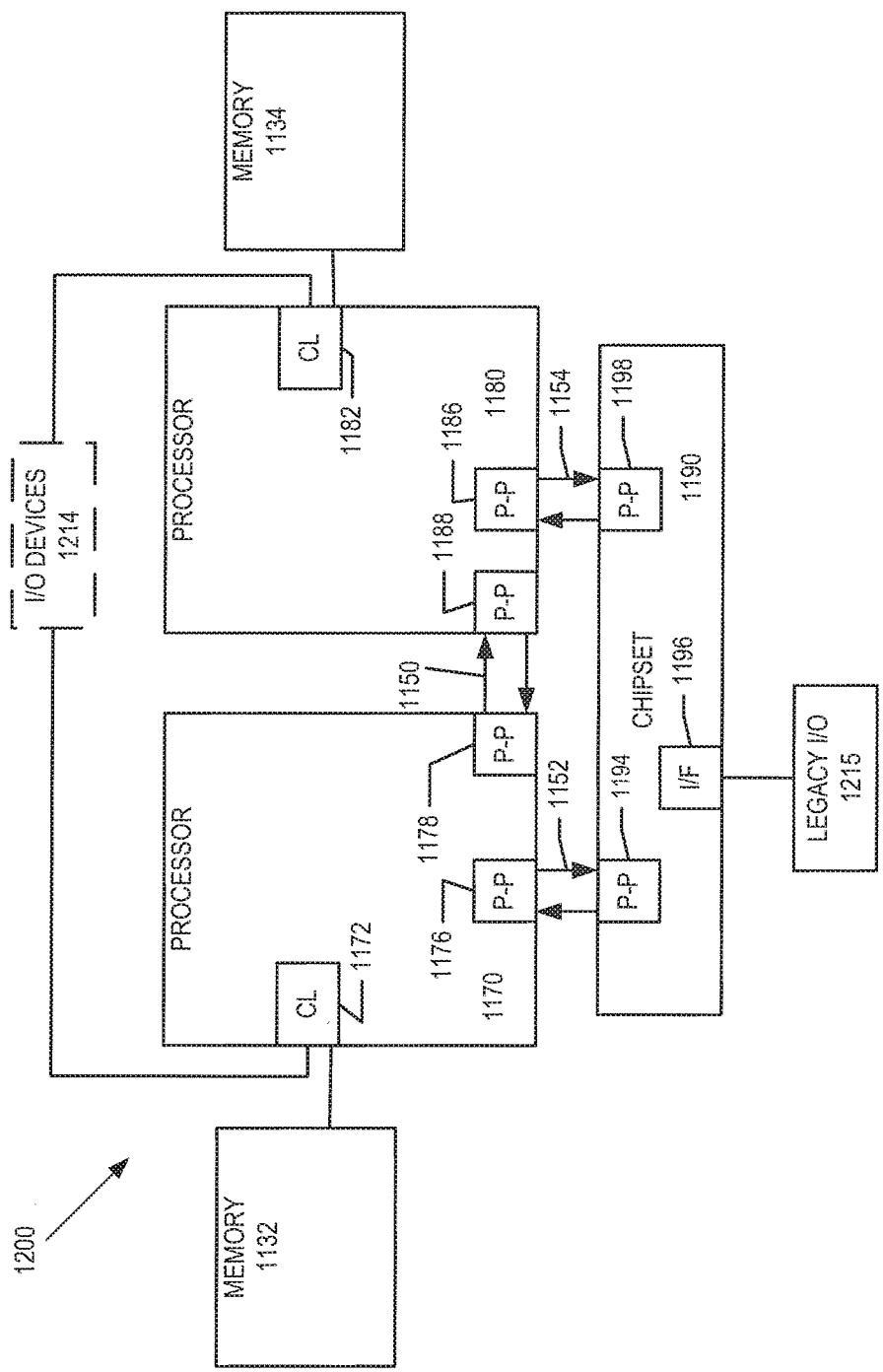
FIG. 12 is a block diagram of a third system in accordance with an embodiment of the invention.

Referring now to FIG. 12, shown is a block diagram of a second more specific exemplary system 1200 in accordance with an embodiment of the present invention. Like elements in FIGS. 11 and 12 bear like reference numerals, and certain aspects of FIG. 11 have been omitted from FIG. 12 in order to avoid obscuring other aspects of FIG. 12.

FIG. 12 illustrates that the processors 1170, 1180 may include integrated memory and I/O control logic ("CL") 1172 and 1182, respectively. Thus, the CL 1172, 1182 include integrated memory controller units and include I/O control logic. FIG. 12 illustrates that not only are the memories 1132, 1134 coupled to the CL 1172, 1182, but also that I/O devices 1214 are also coupled to the control logic 1172, 1182. Legacy I/O devices 1215 are coupled to the chipset 1190.

Figure 13:
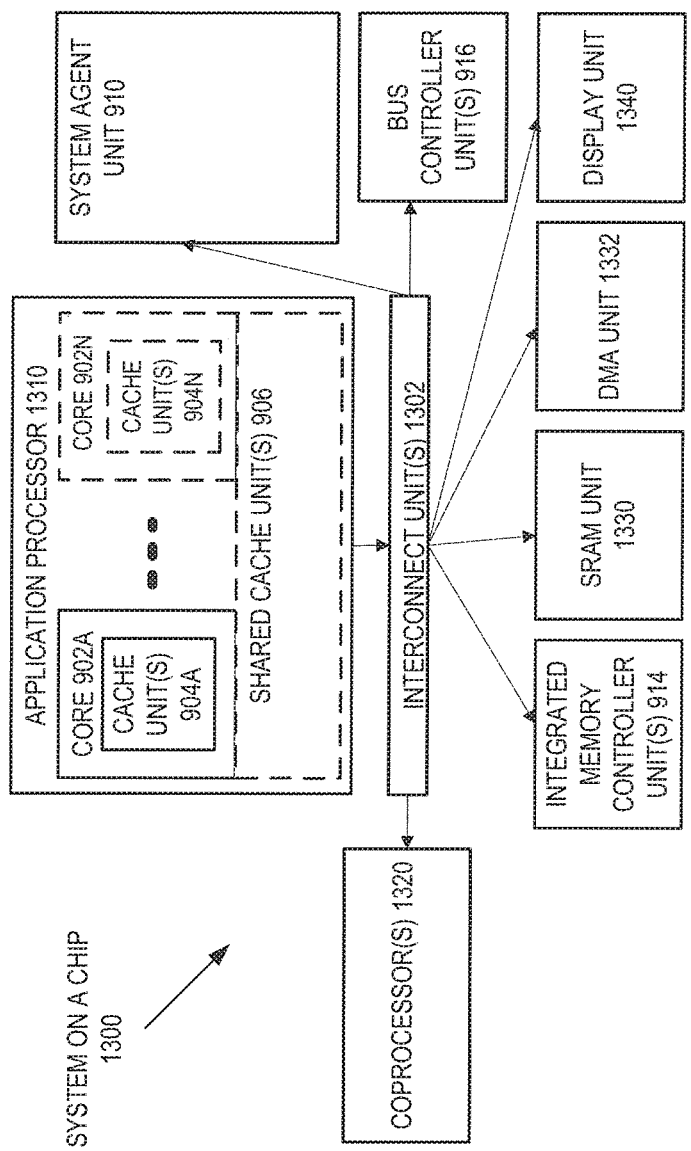
FIG. 13 is a block diagram of a system-on-a-chip (SoC) in accordance with one embodiment.

Referring now to FIG. 13, shown is a block diagram of a SoC 1300 in accordance with an embodiment of the present invention. Similar elements in FIG. 9 bear like reference numerals. Also, dashed lined boxes are optional features on more advanced SoCs. In FIG. 13, an interconnect unit(s) 1302 is coupled to: an application processor 1310 which includes a set of one or more cores 902A-N and shared cache unit(s) 906; a system agent unit 910; a bus controller unit(s) 916; an integrated memory controller unit(s) 914; a set or one or more coprocessors 1320 which may include integrated graphics logic, an image processor, an audio processor, and a video processor; an static random access memory (SRAM) unit 1330; a direct memory access (DMA) unit 1332; and a display unit 1340 for coupling to one or more external displays. In one embodiment, the coprocessor(s) 1320 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1130 illustrated in FIG. 11, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. An apparatus comprising:
   fetch circuitry to fetch instructions, including vector instructions;
   decode circuitry to decode fetched instructions, including fetched vector instructions;
   a plurality of vector registers; and
   execution circuitry coupled to the plurality of vector registers, the execution circuitry operative to:
      receive a first decoded vector instruction to update a liner feedback shift register (LFSR) for stream cipher operations, wherein the first decoded vector instruction specifies two or more of the plurality of vector registers as operands;
      receive a second decoded vector instruction to update a state of a finite state machine (FSM), wherein the FSM receives inputs from re-ordered bits of the LFSR, and wherein the second decoded vector instruction specifies two or more of the plurality of vector registers as operands; and
      execute the first decoded vector instruction and the second decoded vector instruction in a single-instruction multiple data (SIMD) pipeline.

2. The apparatus of claim 1,
   wherein the execution circuitry is further operative to:
   receive a third decoded vector instruction to re-order the bits of the state of the LFSR.

3. The apparatus of claim 1, wherein the second decoded vector instruction specifies a source operand that stores data elements of the LFSR needed for updating the FSM.

4. The apparatus of claim 1, wherein the execution circuitry is further operative to:
   execute the first decoded vector instruction and the second decoded vector instruction in a first phase that uses a first set of source operands;
   execute the first decoded vector instruction and the second decoded vector instruction in a second phase that uses a second set of source operands; and
   repeat the first phase and the second phase in a loop to generate a sequence of outputs for the stream cipher operations.

5. The apparatus of claim 1, wherein the second decoded vector instruction is a SIMD instruction that updates two FSM state registers and generates an output for the stream cipher operations in parallel.

6. The apparatus of claim 5, wherein the execution circuitry is further operative to:
   update the two FSM state registers by applying a set of linear functions to the re-ordered bits of the state of the LFSR, wherein output of each linear function is formed by directly routing inputs of the linear function.

7. The apparatus of claim 1, wherein the execution circuitry is further operative to:
   execute multiple sets of the stream cipher operations in simultaneous streams of pipelining.

8. A method comprising:
   fetching a first vector instruction and a second vector instruction;
   decoding the first fetched vector instruction and the second fetched vector instruction;
   receiving by execution circuitry the first decoded vector instruction, wherein the first decoded vector instruction is to update a liner feedback shift register (LFSR) for stream cipher operations;
   receiving by execution circuitry the second decoded vector instruction, wherein the second decoded vector instruction is to update a state of a finite state machine (FSM), wherein the FSM receives inputs from re-ordered bits of the LFSR; and
   executing the first decoded vector instruction and the second decoded vector instruction in a Single Instruction Multiple Data (SIMD) pipeline.

9. The method of claim 8, further comprising:
   fetching and decoding a third vector instruction;
   receiving the third decoded vector instruction by the execution circuitry, wherein the third decoded vector instruction is to re-order the bits of the LFSR.

10. The method of claim 8, wherein the second decoded vector instruction specifies a source operand that stores data elements of the LFSR needed for updating the FSM.

11. The method of claim 8, further comprising:
    executing the first decoded vector instruction and the second decoded vector instruction in a first phase that uses a first set of source operands;
    executing the first decoded vector instruction and the second decoded vector instruction in a second phase that uses a second set of source operands; and
    repeating the first phase and the second phase in a loop to generate a sequence of outputs for the stream cipher operations.

12. The method of claim 8, wherein the second decoded vector instruction is a SIMD instruction that updates two FSM state registers and generates an output for the stream cipher operations in parallel.

13. The method of claim 12, further comprising:
updating the two FSM state registers by applying a set of linear functions to the re-ordered bits of the state of the LFSR, wherein output of each linear function is formed by directly routing inputs of the linear function.

14. The method of claim 8, further comprising:
executing multiple sets of the stream cipher operations in simultaneous streams of pipelining.

15. A system comprising:
memory; and
a processor coupled to the memory, the processor comprising:
fetch circuitry to fetch instructions, including vector instructions;
decode circuitry to decode fetched instructions, including fetched vector instructions;
a plurality of vector registers; and
execution circuitry coupled to the plurality of vector registers, the execution circuitry operative to:
receive a first decoded vector instruction to update a liner feedback shift register (LFSR) for stream cipher operations, wherein the first decoded vector instruction specifies two or more of the plurality of vector registers as operands;
receive a second decoded vector instruction to update a state of a finite state machine (FSM), wherein the FSM receives inputs from re-ordered bits of the LFSR, and wherein the second decoded vector instruction specifies two or more of the plurality of vector registers as operands; and
execute the first decoded vector instruction and the second decoded vector instruction in a single-instruction multiple data (SIMD) pipeline.

16. The system of claim 15, wherein the execution circuitry is further operative to:
receive a decoded third vector instruction to re-order the bits of the LFSR.

17. The system of claim 15, wherein the second decoded vector instruction specifies a source operand that stores data elements of the LFSR needed for updating the FSM.

18. The system of claim 15, wherein the execution circuitry is further operative to:
execute the first decoded vector instruction and the second decoded vector instruction in a first phase that uses a first set of source operands;
execute the first decoded vector instruction and the second decoded vector instruction in a second phase that uses a second set of source operands; and
repeat the first phase and the second phase in a loop to generate a sequence of outputs for the stream cipher operations.

19. The system of claim 15, wherein the second decoded vector instruction is a SIMD instruction that updates two FSM state registers and generates an output for the stream cipher operations in parallel.

20. The system of claim 19, wherein the execution circuitry is further operative to:
update the two FSM state registers by applying a set of linear functions to the re-ordered bits of the LFSR, wherein output of each linear function is formed by directly routing inputs of the linear function.

21. The system of claim 15, wherein the execution circuitry is further operative to:
execute multiple sets of the stream cipher operations in simultaneous streams of pipelining.

* * * * *